(12) United States Patent
MacDonald et al.

(10) Patent No.: US 8,724,823 B2
(45) Date of Patent: *May 13, 2014

(54) METHOD AND APPARATUS FOR REDUCING NOISE PUMPING DUE TO NOISE SUPPRESSION AND ECHO CONTROL INTERACTION

(75) Inventors: Andrew John MacDonald, San Francisco, CA (US); Jan Skoglund, San Francisco, CA (US); Björn Volcker, Bromma (SE)

(73) Assignee: Google Inc., Mountain View, CA (US)

( * ) Notice: Subject to any disclaimer, the term of this patent is extended or adjusted under 35 U.S.C. 154(b) by 237 days.

This patent is subject to a terminal disclaimer.

(21) Appl. No.: 13/112,962

(22) Filed: May 20, 2011

(65) Prior Publication Data

US 2012/0294452 A1 Nov. 22, 2012

(51) Int. Cl.
*H04B 3/20* (2006.01)

(52) U.S. Cl.
USPC ............ 381/66; 381/83; 381/93; 379/406.01; 379/406.02; 379/406.06; 379/406.07

(58) Field of Classification Search
CPC ........... H04B 15/00; H04B 3/20; H04R 27/00
USPC .............. 381/93, 66, 83; 379/406.02, 406.03, 379/406.04, 406.06–406.07, 406.01
See application file for complete search history.

(56) References Cited

U.S. PATENT DOCUMENTS

| | | | |
|---|---|---|---|
| 6,289,309 B1 * | 9/2001 | deVries | 704/233 |
| 2005/0111655 A1 * | 5/2005 | Pan | 379/406.01 |
| 2012/0027218 A1 * | 2/2012 | Every et al. | 381/66 |

OTHER PUBLICATIONS

Le Bouquin Jeannes et al: "Combined Noise and Echo Reduction in Hands-Free Systems: A Survey", IEEE Transactions on Speech and Audio Processing, vol. 9, No. 8, Nov. 1, 2001, pp. 808-820.
Notification of Transmittal of the International Search Report and the Written Opinion of the International Search Authority, or the Declaration, dated Jul. 11, 2012.

* cited by examiner

*Primary Examiner* — Disler Paul
(74) *Attorney, Agent, or Firm* — Birch, Stewart, Kolasch & Birch, LLP

(57) ABSTRACT

An input signal is processed through noise suppression (NS) and echo control (EC) via a multipath model that reduces noise pumping effects while maintaining EC performance. A copy of a "noisy" input signal is sent to an EC component before the noisy signal is sent to a NS component, which processes the signal first, when there is a consistent noise level for estimation. The copy of the pre-processing noisy signal is sent to the EC component along with a "clean" or "noise-suppressed" signal output from the NS component. The EC component analyzes the noisy signal as if the EC was the first component in the signal chain to determine what actions to take. The EC component then applies these actions to the clean signal received from the NS component.

14 Claims, 5 Drawing Sheets

METHOD AND APPARATUS FOR REDUCING NOISE PUMPING DUE TO NOISE SUPPRESSION AND ECHO CONTROL INTERACTION

FIELD OF THE INVENTION

The present disclosure generally relates to systems and methods for transmission of audio signals such as voice communications. More specifically, aspects of the present disclosure relate to processing audio signals using multiple pathways.

BACKGROUND

In the capture signal processing chain of a real-time communications system, it is advantageous to have the echo control (EC) component process a signal as early in the processing path as possible. Doing so minimizes any distortion between the components receiving the far-end stream bound for rendering and the components of the corresponding near-end stream from capturing.

An example of a conventional approach to arranging audio components in a signal path is shown in FIG. 1. As illustrated, near-end components may include a capture device (e.g., a microphone), an echo control (EC) component, and a noise suppression (NS) component, along with a render device (e.g., a loudspeaker) located at the far end. In using such a conventional approach, the EC component processes a signal input from the capture device before the signal is processed by the NS component. However, a side-effect of the suppression stage in EC is the suppression of noise as well as echo. To maintain as consistent a noise level as possible, suppressed noise is replaced with estimated "comfort noise" during EC processing. Often the comfort noise will not exactly match the background noise level, and in some cases deviates considerably. This deviation creates a change in noise level known as noise "pumping".

Normally, comfort noise algorithms are designed to err on the side of comfort noise being lower than the true noise level. If a signal processed through EC is subsequently processed through noise suppression (NS), the noise pumping effect may be amplified. The NS first analyzes the signal to obtain an estimate of the noise level. When an echo segment arrives, the NS adapts to this (typically) lower comfort noise level, and lowers its suppression level as a result. As the echo segment ends, the arriving noise level returns to its true level. Although the NS begins to adapt accordingly, it generally takes some time for the NS to converge on a good estimate. During this period of NS adjustment the actual noise is insufficiently suppressed, and as a result, the perceptual effect of the noise pumping increases.

An alternative approach might simply place the NS component in front of the EC component. However, such an approach introduces possible distortion between near-end and far-end components.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

One embodiment of the present disclosure relates to a method for noise suppression and echo control processing of an audio signal comprising: receiving, at a noise suppression component, a noisy signal input from an audio capture device; generating, by the noise suppression component, a noise-suppressed signal from the noisy signal; determining, by the echo control component, echo control processing based on the noisy signal; and applying, by the echo control component, the echo control processing to the noise-suppressed signal.

In another embodiment of the disclosure, the method for noise suppression and echo control processing further comprises buffering the noisy signal provided to the echo control component.

In another embodiment of the disclosure, the method for noise suppression and echo control processing further comprises, in response to receiving the noisy signal from the audio capture device, providing a copy of the noisy signal to a delay block; and using the delay block to introduce delay in providing the copy of the noisy signal to the echo control component.

In yet another embodiment of the disclosure, the noise suppression component generating the noise-suppressed signal from the noisy signal further includes: estimating a noise spectrum of the noisy signal; estimating a noise presence in the noisy signal based on the estimated noise spectrum; and suppressing the estimated noise presence using a Wiener type filter.

Another embodiment of the disclosure relates to a system for noise suppression and echo control processing comprising: a noise suppression component configured to receive a noisy signal input from an audio capture device, and generate a noise-suppressed signal from the noisy signal; and an echo control component configured to analyze the noisy signal to determine echo control processing, and apply the echo control processing to the noise-suppressed signal generated by the noise suppression component.

In another embodiment, the system for noise suppression and echo control processing further comprises a delay block configured to receive the noisy signal from the audio capture device and send the noisy signal to the echo control component following a delay interval.

In another embodiment of the system for noise suppression and echo control processing, the echo control component is further configured to transform the noisy signal and the noise-suppressed signal to the frequency-domain.

In still another embodiment of the system for noise suppression and echo control processing, the noise suppression component is further configured to estimate a noise spectrum of the noisy signal, estimate a noise presence in the noisy signal based on the estimated noise spectrum, and suppress the estimated noise presence using a Wiener type filter.

In other embodiments of the disclosure, the methods and systems described herein may optionally include one or more of the following additional features: the buffering is in response to delay in providing the noise-suppressed signal from the noise suppression component to the echo control component, the echo control component determines the echo control processing based on the noisy signal in the frequency-domain, the echo control component applies the echo control processing to the noise-suppressed signal in the frequency-domain, the noise suppression component generates the noise-suppressed signal from the noisy signal in the frequency-domain, the delay introduced by the delay block is to compensate for delay in providing the noise-suppressed signal from the noise suppression component to the echo control component.

Further scope of applicability of the present invention will become apparent from the Detailed Description given below. However, it should be understood that the Detailed Description and specific examples, while indicating preferred embodiments of the invention, are given by way of illustration only, since various changes and modifications within the spirit and scope of the invention will become apparent to those skilled in the art from this Detailed Description.

BRIEF DESCRIPTION OF DRAWINGS

These and other objects, features and characteristics of the present disclosure will become more apparent to those skilled in the art from a study of the following Detailed Description in conjunction with the appended claims and drawings, all of which form a part of this specification. In the drawings:

Figure 1:
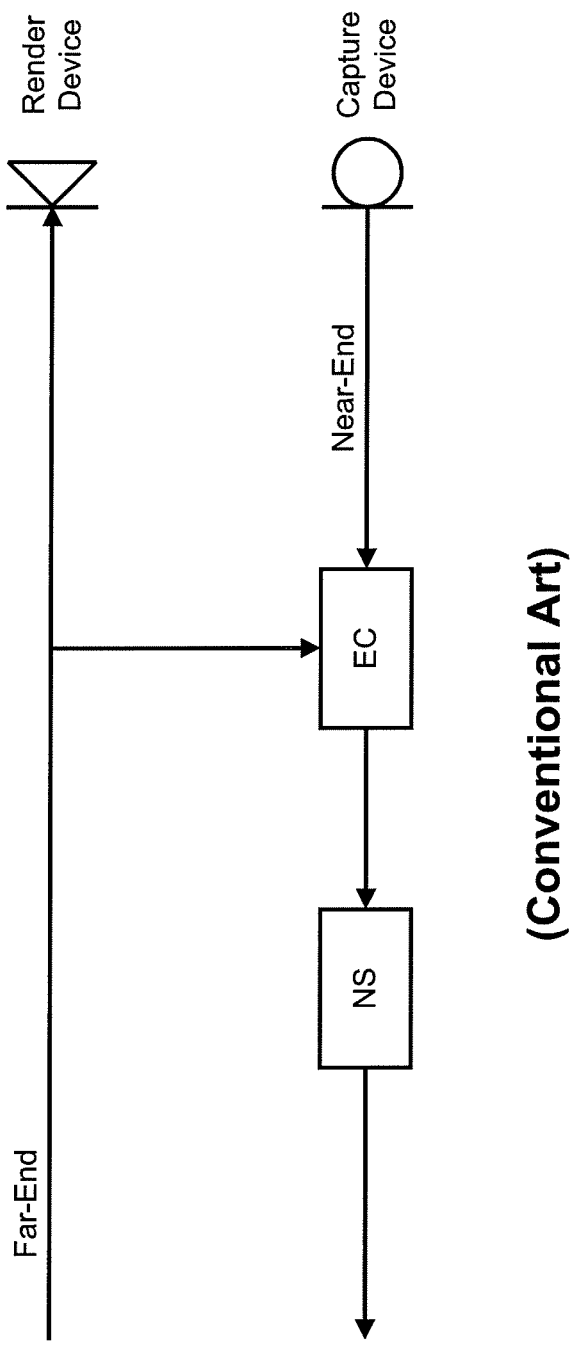
FIG. 1 is a functional block diagram illustrating a conventional arrangement of audio processing components.

The headings provided herein are for convenience only and do not necessarily affect the scope or meaning of the claimed invention.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other obvious features not described in detail herein. Additionally, some well-known structures or functions may not be shown or described in detail below, so as to avoid unnecessarily obscuring the relevant description.

In one or more arrangements, an input signal is processed through noise suppression (NS) and echo control (EC) via a multipath model that reduces noise pumping effects while maintaining EC performance. As will be described in greater detail herein, a "noisy" input signal received at an audio quality unit (e.g., audio enhancement engine, audio improvement module, etc.) is copied (e.g., stored in a memory of the audio quality unit) and then passed to a NS component of the audio quality unit. The NS component processes the noisy signal through noise suppression before the signal is manipulated or altered by other processing components of the audio quality unit, when there is a consistent noise level for estimation. The copy of the pre-processing noisy signal is passed to an EC component along with a "clean" or "noise-suppressed" signal output from the NS component. The EC component analyzes the copy of the noisy signal as if the EC were the first component in the signal chain of the audio quality unit to determine what echo control actions to take on the signal. However, rather than the EC component applying these actions to the copy of the noisy signal, the EC component applies these actions to the clean signal received from the NS component.

Figure 2:
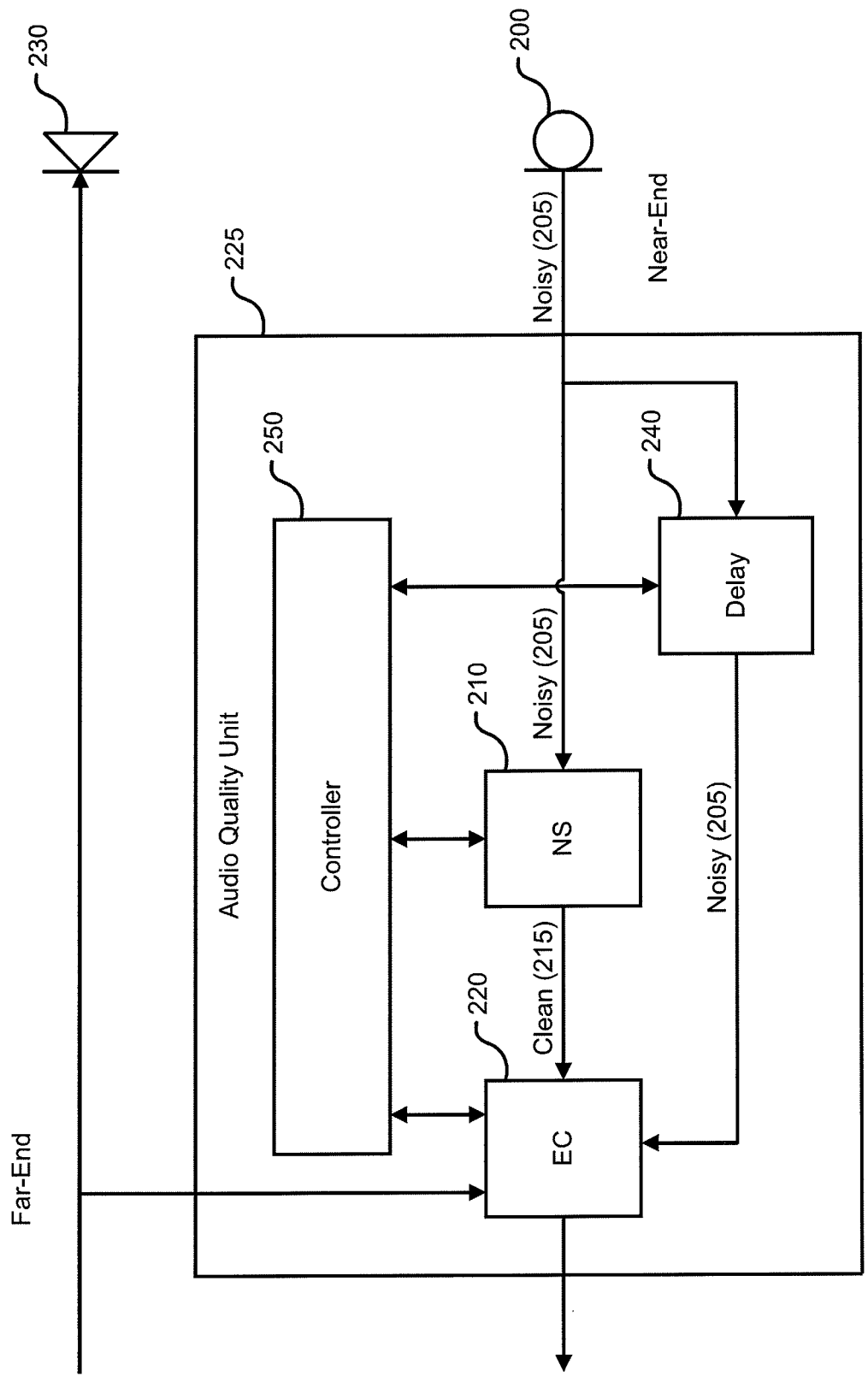
FIG. 2 is a functional block diagram illustrating an arrangement of audio processing components according to one or more embodiments described herein.

FIG. 2 illustrates an example arrangement of processing components according to various embodiments described herein. As shown, near-end components may include a capture device 200 and an audio quality unit 225, while the far-end may include a render device 230. Audio quality unit 225 may include a NS component 210, an EC component 220, a delay block 240, and a controller 250. Audio quality unit 225 may also include other audio processing components designed to improve or enhance the quality of audio (e.g., speech) in addition to or instead of the components illustrated in FIG. 2. For example, in some arrangements, the audio quality unit 225 may also include an automatic gain control component, a voice activity detection component, and/or other components designed to enhance one or more characteristics of audio signals.

Capture device 200 may be any of a variety of audio input devices, such as one or more microphones configured to capture sound and generate input signals. Render device 230 may be any of a variety of audio output devices, including a loudspeaker or group of loudspeakers configured to output sound of one or more channels. For example, capture device 200 and render device 230 may be hardware devices internal to a computer system, or external peripheral devices connected to a computer system via wired and/or wireless connections. In some arrangements, capture device 200 and render device 230 may be components of a single device, such as a speakerphone, telephone handset, etc. Additionally, one or both of capture device 200 and render device 230 may include analog-to-digital and/or digital-to-analog transformation functionalities.

Controller 250 may be configured to control the arrangement of components (e.g., NS component 210, EC component 220, etc.) within audio quality unit 225 and manage the passing of signals and other information between the components as described herein. For example, the controller 250 may direct noisy signal 205, or a copy of noisy signal 205, to the delay block 240 before the noisy signal 205 is passed to EC component 220 along with clean signal 215 from NS component 205. In at least some arrangements, controller 250 handles the timing and direction of such signal passing between the components of audio quality unit 225. For example, controller 250 may monitor the passing of noisy signal 205 and clean signal 215 to EC component 220 and, as a result of such monitoring, direct noisy signal 205 to delay block 240 to compensate for any delay introduced into the process. In some scenarios, NS component 210 may introduce algorithmic delay during noise suppression processing of noisy signal 205. Controller 250 may be configured to recognize the introduction of such delay and coordinate various processes to compensate for the delay, such as lengthening the period time that noisy signal 205 remains at delay block 240 before being passed to EC component 220. In one or more other examples, controller 250 may direct the noisy signal 205 to undergo buffering (e.g., using one or more FIFO buffers (not shown in FIG. 2)) before being passed to EC component 220. In still other arrangements, controller 250 may be configured to detect and compensate for delay introduced into the exchange of signals within audio quality unit 225 in numerous other ways in addition to or instead of those described above. In any such arrangements, controller 250 may use its knowledge of NS component 210 and EC component 220 to ensure that performance is maintained during the processing of audio signals through audio quality unit 225.

Capture device 200, alone or in combination with one or more other input components (not shown), inputs a noisy signal 205. Noisy signal 205 typically includes some level of noise and some sound of interest, such as human speech, music, and the like. In at least this arrangement, a copy of noisy signal 205 is forwarded to delay block 240 prior to noisy signal 205 being processed by NS component 210. NS component 210 receives noisy signal 205, and after processing noisy signal 205 through noise suppression, outputs clean signal 215. As used herein, a "clean" or "noise-suppressed" signal refers to a signal that has gone through noise suppression processing. However, a "clean" or "noise-suppressed" signal does not imply that all noise in the signal has been suppressed or removed. Rather, some amount of noise may still be present in a clean signal that is output from noise suppression processing. NS component 210 receives noisy signal 205 before noisy signal 205 has undergone any echo control processing. As a result, NS component 210 processes noisy signal 205 when a consistent noise level is present in the signal, e.g., a noise level that has not yet been manipulated by the addition of any comfort noise. For example, when NS component 210 first receives noisy signal 205 and begins analyzing the signal to obtain a noise estimate, NS component 210 analyzes the signal at its true (e.g., non-manipulated) noise level, and may adjust its suppression level accordingly.

EC component 220 receives the copy of noisy signal 205 from delay block 240 along with clean signal 215 output from NS component 210. EC component analyzes noisy signal 205 to determine what echo control actions (e.g., echo suppression) to take, and then applies those actions on clean signal 215. In this manner, EC component 220 analyzes noisy signal 205 as though EC component 220 received noisy signal 205 before NS component 210. Stated differently, because EC component 220 analyzes noisy signal 205, EC component 220 processes clean signal 215 as though clean signal 215 was received as the initial input signal from capture device 200. This minimizes any distortion that may otherwise result from EC component 220 analyzing clean signal 215 to determine what actions to take during echo control processing.

In at least one embodiment, EC component 220 is configured to receive two signal inputs via two different pathways, the first signal pathway receiving noisy signal 205 from delay block 240, and the second signal pathway receiving clean signal 215 from NS component 210. In at least this embodiment, EC component 220 may transform both noisy signal 205 and clean signal 215 to the frequency domain (e.g., using the Fourier Transform) for analysis and processing. As described above, EC component 220 performs all of its analysis on noisy signal 205 and then applies the resulting processing actions on clean signal 215. After EC component 220 processes clean signal 215, EC component 220 may then invert clean signal 215 back to the time-domain (e.g., using the inverse Fourier Transform). Additionally, EC component 220 may discard noisy signal 205 after analyzing the signal to determine what processing actions to take on clean signal 215.

In one or more arrangements of the disclosure, such as the arrangement illustrated in FIG. 2, noisy signal 205 may be copied from a memory space of audio quality unit 225 to delay block 240, such that delay is introduced to compensate for any delay between EC component 220 receiving noisy signal 205 and EC component 220 receiving clean signal 215.

In other arrangements, a buffer (e.g., a FIFO buffer) may be introduced into audio quality unit 225 in order to compensate for such delay. For example, algorithmic delay introduced by NS component 210 during noise suppression processing of noisy signal 205 may be further compensated, if necessary, by buffering the copy of noisy signal 205 provided to EC component 220 from delay block 240. Buffering the copy of noisy signal 205 in this manner improves the overall quality of sound output to a user as a result of audio signals processed through audio quality unit 225. Compensating for algorithmic or other delay introduced by NS component 210 may be accomplished in numerous other ways in addition to or instead of buffering the copy of noisy signal 205 as described above.

Figure 3:
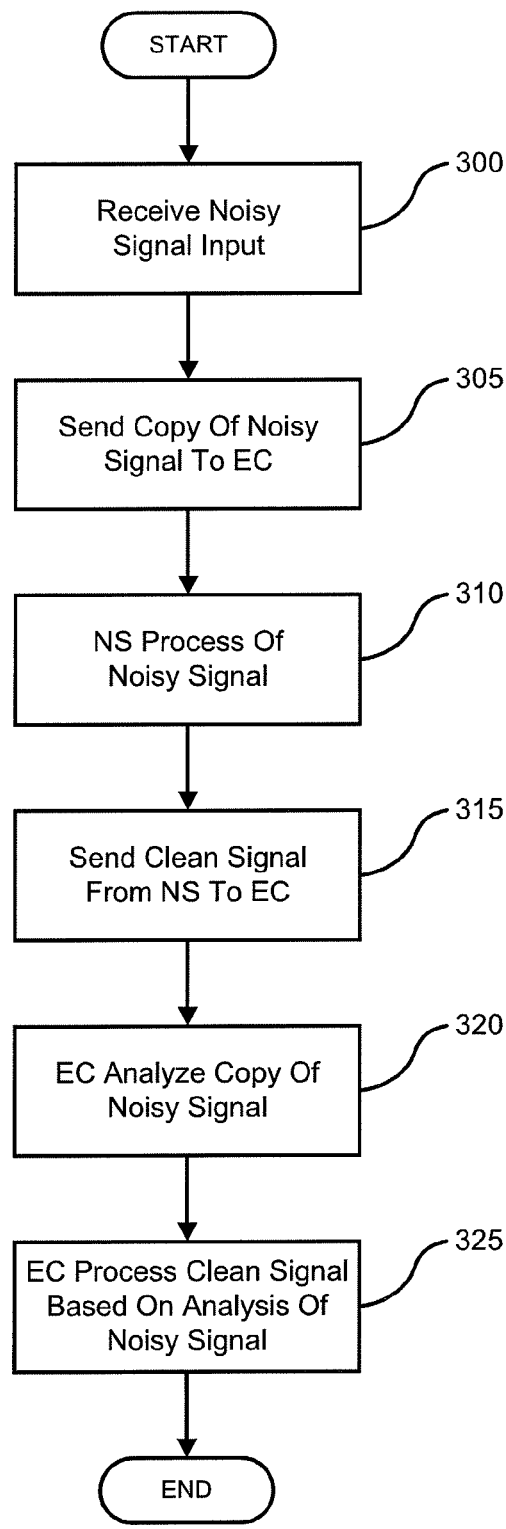
FIG. 3 is a flowchart illustrating noise suppression and echo control processing according to one or more embodiments described herein.

FIG. 3 illustrates a method of noise suppression and echo control processing according to at least one embodiment of the present disclosure. The process begins in step 300 where a noisy signal (e.g., noisy signal 205 shown in FIG. 2) input is received from, for example, one or more capture devices (e.g., capture device 200 shown in FIG. 2). In step 305, a copy of the noisy signal (e.g., a copy of the noisy signal stored in a memory of, e.g., an audio quality unit that receives the noisy signal from the one or more capture devices in step 300) is sent to an EC component (e.g., EC component 220 shown in FIG. 2). In one example, a copy of the input noisy signal may be stored (e.g., in delay block 240 of audio quality unit 225 shown in FIG. 2) and sent to the EC component following a period of delay (e.g., until a clean signal is sent from a NS component, such as clean signal 215 sent from NS component 210 shown in FIG. 2). In another example, a copy of the input noisy signal may be sent to the EC component when the noisy signal is received at the NS component, so as to allow the EC component time to analyze the signal before a clean signal arrives for processing.

In step 310, a NS component (e.g., NS component 210 shown in FIG. 2) processes the noisy signal through noise suppression. In one or more arrangements, the noise suppression processing of the signal in step 310 includes noise estimation and suppression performed in the frequency domain. For example, the noise suppression may include estimating the noise spectrum of the signal to determine an estimate of noise presence in the signal, and suppressing the estimated noise present in the signal through a Wiener type filter. Numerous variations of such noise estimation and suppression may also be used in addition to or instead of those described.

In at least one arrangement, the NS component processes the noisy signal in step 310 when a consistent noise level is present in the signal. For example, the NS component may process the noisy signal before the noise level in the signal has been altered and/or manipulated (e.g., by the addition of comfort noise) as a result of any other processing (e.g., echo control processing). Such other processing may cause the noise level in the noisy signal received in step 310 to deviate from the true noise level, thus resulting in insufficient noise suppression.

In step 315, a clean signal is sent from the NS component to the EC component (e.g., clean signal 215 sent from NS component 210 to EC component 220 shown in FIG. 2). In step 320, the EC component analyzes the copy of the noisy signal sent in step 305.

In some arrangements the EC component may analyze the copy of the noisy signal before the clean signal is sent from the NS component in step 315, while in other arrangements the EC component may delay analyzing the copy of the noisy signal received in step 305 until the clean signal is received.

In any of such arrangements, the EC component processes the clean signal in step 325 based on the EC component's analysis of the copy of the noisy signal in step 320. For example, in step 320 the EC component may analyze the copy of the noisy signal to determine what echo control actions (e.g., echo suppression) to take, and then in step 325 the EC component may apply those actions on the clean signal received in step 315. As such, the EC component analyzes the noisy signal as though the EC component received the noisy signal before the NS component. Similarly, because the EC component analyzes the noisy signal in step 320, the EC component processes the clean signal in step 325 as though the clean signal was received as the initial input signal in step 300.

Figure 4:
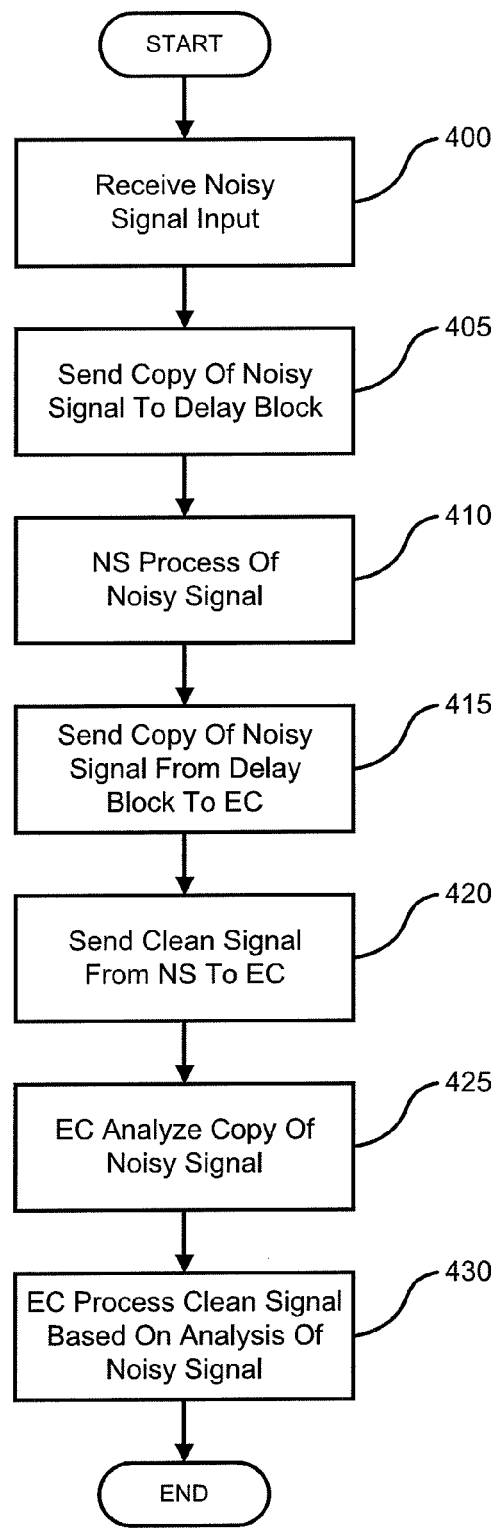
FIG. 4 is a flowchart illustrating noise suppression and echo control processing according to one or more embodiments described herein.

FIG. 4 illustrates another method of noise suppression and echo control processing according to one or more embodiments of the present disclosure. The process illustrated in FIG. 4 differs from the process illustrated in FIG. 3. In particular, the process illustrated in FIG. 4 introduces a delay (e.g., by using the delay block 240 shown in FIG. 2) in sending the copy of the pre-processing noisy signal to the EC component (e.g., noisy signal 205 sent to EC component 220 shown in FIG. 2). The process begins in step 400 where a noisy signal input is received from, for example, one or more capture devices (e.g., capture device 200 shown in FIG. 2).

In step 405, a copy of the noisy signal (e.g., a copy of the noisy signal stored in a memory space of, e.g., an audio quality unit that receives the noisy signal from the one or more capture devices in step 400) is sent to a delay block (e.g., delay block 240 shown in FIG. 2). In some embodiments, a controller (e.g., controller 250 shown in FIG. 2) may direct the copy of the noisy signal to the delay block to compensate for any algorithmic or other delay introduced by, for example, noise suppression processing of the noisy signal.

In step 410, a NS component (e.g., NS component 210 shown in FIG. 2) processes the noisy signal through noise suppression. In at least some arrangements, the noise suppression processing of the noisy signal in step 410 proceeds in a similar manner as the noise suppression processing of the noisy signal in step 310 shown in FIG. 3 and described above. For example, in some arrangements, the noise suppression processing of the noisy signal in step 410 includes noise estimation and noise suppression performed in the frequency domain. The noise suppression may be achieved through a Wiener type filter and be based on an estimation of the noise spectrum to determine an estimate of the noise presence in the signal. Numerous variations of such noise estimation and suppression may also be used in the noise suppression processing of step 410 in addition to or instead of those described. Additionally, the NS component processes the noisy signal in step 410 when a consistent noise level is present in the signal, such as before the noise level has been altered and/or manipulated as a result of other processing (e.g., echo control processing that may add comfort noise to the signal).

In step 415, the copy of the noisy signal is sent from the delay block to the EC component. As will be described in greater detail below, in one or more arrangements, a controller (e.g., controller 250 shown in FIG. 2) of the audio quality unit may coordinate the timing of the passing of the noisy signal from the delay block to the EC component in step 415.

In step 420, a clean signal is sent from the NS component to the EC component (e.g., clean signal 215 sent from NS component 210 to EC component 320 shown in FIG. 2). The process then continues to step 425 where the EC component analyzes the copy of the noisy signal sent in step 415 from the delay block. While in some arrangements the EC component may analyze the copy of the noisy signal in step 425 before the clean signal is sent from the NS component in step 420, in other arrangements the sending of the copy of the noisy signal to the delay block in step 405 compensates for any delay in the EC component analyzing the copy of the noisy signal and receiving the clean signal in step 420. As mentioned above, a controller of the audio quality unit may monitor the timing of the noise suppression processing in step 410, and accordingly adjust the period of compensation delay introduced by the noisy signal being sent to the delay block in step 405 and being sent from the delay block to the EC component in step 415. As such, in at least some embodiments of the disclosure, compensation delay may be optionally introduced into the noise suppression and echo control process illustrated, and may also be adjusted as needed.

In step 420, a clean signal is sent from the NS component to the EC component (e.g., clean signal 215 sent from NS component 210 to EC component 220 shown in FIG. 2). The process then continues to step 425 where the EC component analyzes the copy of the noisy signal sent in step 415 from the delay block. While in some arrangements the EC component may analyze the copy of the noisy signal in step 425 before the clean signal is sent from the NS component in step 420, in other arrangements the sending of the copy of the noisy signal to the delay block in step 405 compensates for any delay in the EC component analyzing the copy of the noisy signal and receiving the clean signal in step 420. As mentioned above, a controller of the audio quality unit may monitor the timing of the noise suppression processing in step 410, and accordingly adjust the period of compensation delay introduced by the noisy signal being sent to the delay block in step 405 and being sent from the delay block to the EC component in step 415. As such, in at least some embodiments of the disclosure, compensation delay may be optionally introduced into the noise suppression and echo control process illustrated, and may also be adjusted as needed.

Figure 5:
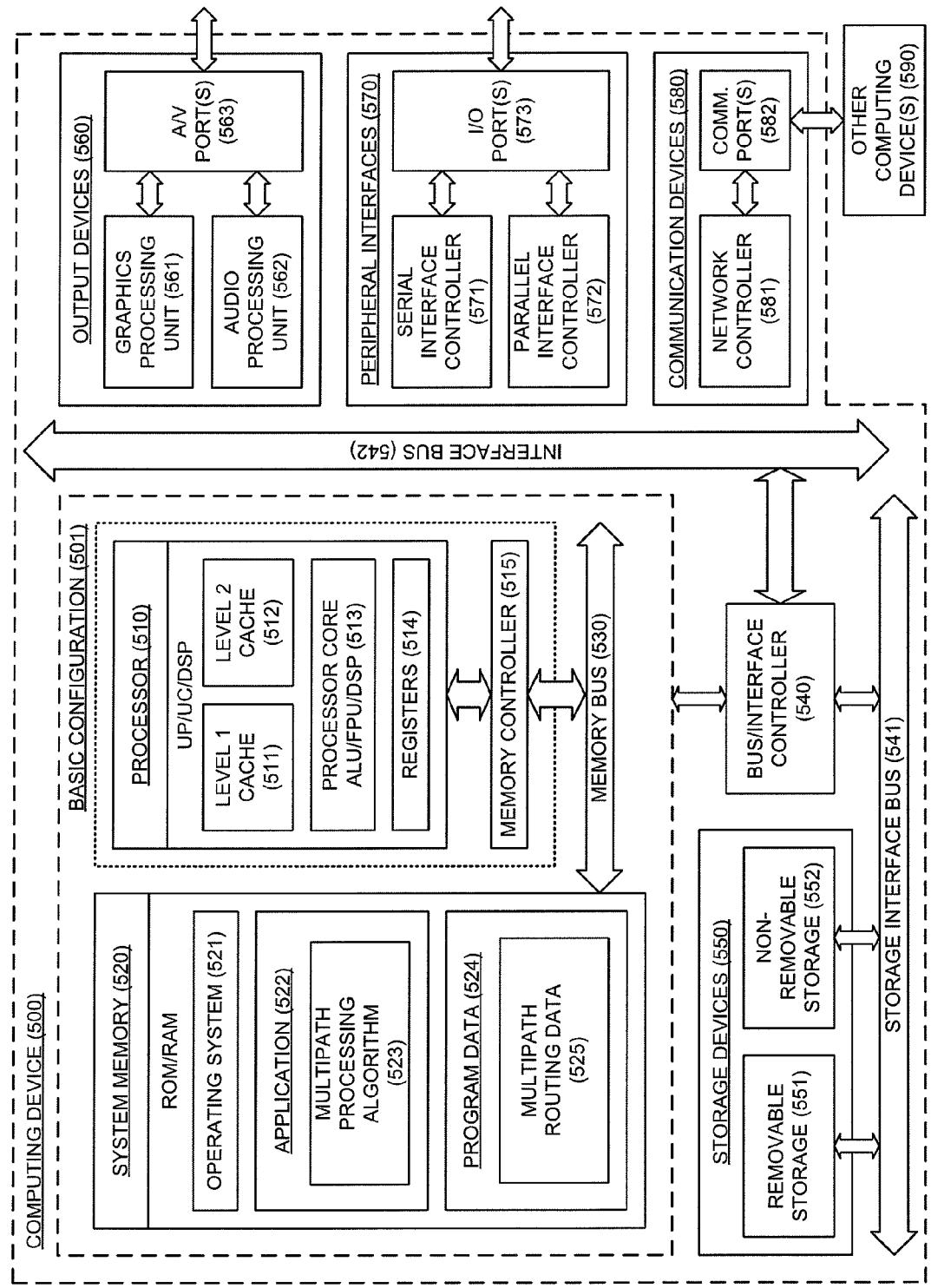
FIG. 5 is a block diagram illustrating an example computing device arranged for multipath routing and processing of audio input signals according to one or more embodiments described herein.

FIG. 5 is a block diagram illustrating an example computing device 500 that is arranged for multipath routing in accordance with one or more embodiments of the present disclosure. In a very basic configuration 501, computing device 500 typically includes one or more processors 510 and system memory 520. A memory bus 530 may be used for communicating between the processor 510 and the system memory 520.

Depending on the desired configuration, processor 510 can be of any type including but not limited to a microprocessor (μP), a microcontroller (μC), a digital signal processor (DSP), or any combination thereof. Processor 510 may include one or more levels of caching, such as a level one cache 511 and a level two cache 512, a processor core 513, and registers 514. The processor core 513 may include an arithmetic logic unit (ALU), a floating point unit (FPU), a digital signal processing core (DSP Core), or any combination thereof. A memory controller 515 can also be used with the processor 510, or in some embodiments the memory controller 515 can be an internal part of the processor 510.

Depending on the desired configuration, the system memory 520 can be of any type including but not limited to volatile memory (e.g., RAM), non-volatile memory (e.g., ROM, flash memory, etc.) or any combination thereof. System memory 520 typically includes an operating system 521, one or more applications 522, and program data 524. In at least some embodiments, application 522 includes a multipath processing algorithm 523 that is configured to pass a noisy input signal (e.g., noisy signal 205 shown in FIG. 2) to a noise suppression component and an echo control component of an audio quality unit (e.g., NS component 210 and EC component 220 of audio quality unit 225 shown in FIG. 2). The multipath processing algorithm is further arranged to pass a noise-suppressed signal (e.g., clean signal 215 shown in FIG. 2) output from the noise suppression component to the echo control component, where the echo control component analyzes the received noisy signal to determine what echo control actions (e.g., echo suppression) to take, and applies those actions to the noise-suppressed or clean signal.

Program Data 524 may include multipath routing data 525 that is useful for passing a noisy input signal along multiple signal pathways to, for example, a noise suppression component and an echo control component, such that each component receives the noisy signal before the signal has been manipulated or altered by any audio processing. In some embodiments, application 522 can be arranged to operate with program data 524 on an operating system 521 such that a received noisy input signal is directed to a delay block (e.g., delay block 240 shown in FIG. 2) before being passed to an echo control component (e.g., EC component 220 shown in FIG. 2) for analysis via one signal pathway, and the noisy signal is also directed via a second signal pathway to a noise suppression component for noise suppression processing before a clean signal is sent along the same pathway to the echo control component.

Computing device 500 can have additional features and/or functionality, and additional interfaces to facilitate communications between the basic configuration 501 and any required devices and interfaces. For example, a bus/interface controller 540 can be used to facilitate communications between the basic configuration 501 and one or more data storage devices 550 via a storage interface bus 541. The data storage devices 550 can be removable storage devices 551, non-removable storage devices 552, or any combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), tape drives and the like. Example computer storage media can include volatile and nonvolatile, removable and non-removable media implemented in any method or technology for storage of information, such as computer readable instructions, data structures, program modules, and/or other data.

System memory 520, removable storage 551 and non-removable storage 552 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media can be part of computing device 500.

Computing device 500 can also include an interface bus 542 for facilitating communication from various interface devices (e.g., output interfaces, peripheral interfaces, communication interfaces, etc.) to the basic configuration 501 via the bus/interface controller 540. Example output devices 560 include a graphics processing unit 561 and an audio processing unit 562 (e.g., audio quality unit 225 shown in FIG. 2 or audio quality unit 325 shown in FIG. 3), either or both of which can be configured to communicate to various external devices such as a display or speakers via one or more A/V ports 563. Example peripheral interfaces 570 include a serial interface controller 571 or a parallel interface controller 572, which can be configured to communicate with external devices such as input devices (e.g., keyboard, mouse, pen, voice input device, touch input device, etc.) or other peripheral devices (e.g., printer, scanner, etc.) via one or more I/O ports 573. An example communication device 580 includes a network controller 581, which can be arranged to facilitate communications with one or more other computing devices 590 over a network communication (not shown) via one or more communication ports 582. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 500 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 can also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost versus efficiency tradeoffs. There are various vehicles by which processes and/or systems and/or other technologies described herein can be effected (e.g., hardware, software, and/or firmware), and the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation. In one or more other scenarios, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

In one or more embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments described herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof. Those skilled in the art will further recognize that designing the circuitry and/or writing the code for the software and/or firmware would be well within the skill of one of skilled in the art in light of the present disclosure.

Additionally, those skilled in the art will appreciate that the mechanisms of the subject matter described herein are capable of being distributed as a program product in a variety of forms, and that an illustrative embodiment of the subject matter described herein applies regardless of the particular type of signal-bearing medium used to actually carry out the distribution. Examples of a signal-bearing medium include, but are not limited to, the following: a recordable-type medium such as a floppy disk, a hard disk drive, a Compact Disc (CD), a Digital Video Disk (DVD), a digital tape, a computer memory, etc.; and a transmission-type medium such as a digital and/or an analog communication medium (e.g., a fiber optic cable, a waveguide, a wired communications link, a wireless communication link, etc.).

Those skilled in the art will also recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method comprising:
    receiving, at a noise suppression component, a noisy signal input from an audio capture device;
    generating, by the noise suppression component, a noise-suppressed signal from the noisy signal;
    determining, by an echo control component, echo suppression based on the noisy signal input from the audio capture device;
    sending, by the noise suppression component, the noise-suppressed signal to the echo control component; and
    applying, by the echo control component, the determined echo suppression to the noise-suppressed signal.

2. The method of claim 1, further comprising buffering the noisy signal provided to the echo control component.

3. The method of claim 2, wherein the buffering is in response to delay in providing the noise-suppressed signal from the noise suppression component to the echo control component.

4. The method of claim 1, wherein the echo control component determines the echo suppression based on the noisy signal in the frequency domain, and wherein the echo control component applies the echo suppression to the noise-suppressed signal in the frequency domain.

5. The method of claim 1, wherein the noise suppression component generates the noise-suppressed signal from the noisy signal in the frequency domain.

6. The method of claim 1, further comprising:
    in response to receiving the noisy signal from the audio capture device, providing a copy of the noisy signal to a delay block; and
    using the delay block to introduce delay in providing the copy of the noisy signal to the echo control component.

7. The method of claim 6, wherein the delay introduced by the delay block is to compensate for delay in providing the noise-suppressed signal from the noise suppression component to the echo control component.

8. The method of claim 1, wherein the noise suppression component generating the noise-suppressed signal from the noisy signal includes:
    estimating a noise spectrum of the noisy signal;
    estimating a noise presence in the noisy signal based on the estimated noise spectrum; and
    suppressing the estimated noise presence using a Wiener type filter.

9. A system for noise suppression and echo control processing, comprising:
    a noise suppression component configured to:
        receive a noisy signal input from an audio capture device, and
        generate a noise-suppressed signal from the noisy signal; and
    an echo control component configured to:
        analyze the noisy signal input from the audio capture device to determine echo suppression,
        receive the noise-suppressed signal from the noise suppression component, and
        apply the echo suppression to the noise-suppressed signal generated by the noise suppression component.

10. The system of claim 9, wherein the echo control component analyzes the noisy signal in the frequency domain to determine the echo suppression, and wherein the echo control component applies the echo suppression to the noise-suppressed signal in the frequency-domain.

11. The system of claim 9, further comprising:
    a delay block configured to:
        receive the noisy signal from the audio capture device; and
        send the noisy signal to the echo control component following a delay interval.

12. The system of claim 11, wherein the delay interval is based on a delay in the noise suppression component providing the noise-suppressed signal to the echo control component.

13. The system of claim 9, wherein the echo control component is further configured to transform the noisy signal and the noise-suppressed signal to the frequency domain.

14. The system of claim 9, wherein the noise suppression component is further configured to:
- estimate a noise spectrum of the noisy signal;
- estimate a noise presence in the noisy signal based on the estimated noise spectrum; and
- suppress the estimated noise presence using a Wiener type filter.

* * * * *